United States Patent
Doerfler

(10) Patent No.: US 6,762,711 B1
(45) Date of Patent: Jul. 13, 2004

(54) METHOD FOR DETECTING TARGET OBJECTS AND FOR DETERMINING THEIR DIRECTION AND THE LIKE FOR A RADAR DEVICE

(75) Inventor: Reiner Doerfler, Lappersdorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/869,937

(22) PCT Filed: Jan. 3, 2000

(86) PCT No.: PCT/DE00/00011

§ 371 (c)(1),
(2), (4) Date: Jul. 9, 2001

(87) PCT Pub. No.: WO00/40999

PCT Pub. Date: Jul. 13, 2000

(30) Foreign Application Priority Data

Jan. 7, 1999 (DE) .......................... 199 00 328

(51) Int. Cl.⁷ .......................... G01S 13/93; G01S 13/44
(52) U.S. Cl. .......................... 342/70; 342/27; 342/28; 342/59; 342/118; 342/128; 342/147; 342/149; 342/195
(58) Field of Search .................. 342/59, 118, 128–133, 342/147, 148, 155–158, 27, 28, 70, 71, 72, 175, 195, 149–154

(56) References Cited

U.S. PATENT DOCUMENTS

| | | | | |
|---|---|---|---|---|
| 4,319,242 A | * | 3/1982 | Lewis ........................ | 342/59 |
| 4,947,176 A | | 8/1990 | Inatsune et al. | |
| 5,181,037 A | * | 1/1993 | Komatsu ...................... | 342/70 |
| 5,229,774 A | * | 7/1993 | Komatsu ...................... | 342/70 |
| 5,598,163 A | * | 1/1997 | Cornic et al. ................. | 342/70 |
| 5,614,909 A | * | 3/1997 | Komatsu et al. .............. | 342/70 |
| 5,815,112 A | | 9/1998 | Sasaki et al. | |
| 5,933,109 A | * | 8/1999 | Tohya et al. ................. | 342/175 |
| 6,137,434 A | * | 10/2000 | Tohya et al. ................. | 342/70 |

FOREIGN PATENT DOCUMENTS

| | | |
|---|---|---|
| DE | 43 23 387 A1 | 7/1993 |
| DE | 197 14 570 A1 | 4/1997 |
| EP | 0 172 094 A1 | 7/1985 |
| EP | 0 410 345 A2 | 7/1990 |
| EP | 0 727 051 B1 | 11/1994 |
| EP | 0 805 360 A2 | 4/1997 |
| WO | 95/12824 A1 | 5/1995 |

OTHER PUBLICATIONS

EP Abstract, Publication No. 63186176, Jan. 8, 1988, Patent Abstracts of Japan.

* cited by examiner

Primary Examiner—Bernarr E. Gregory
(74) Attorney, Agent, or Firm—Morrison & Foerster LLP

(57) ABSTRACT

In a method for detecting target objects and determining their direction, range, speed and the like for a radar device, the invention provides that at least three transmitting and receiving devices for radar beams are arranged in such a manner that their beam fields (a, b, c, d, e) form the dectection area of the radar device, and the at least three transmitting and receiving devices are activated and deactivated successively in such a manner that at least two adjacent transmitting and recieving devices are activated simultaneously.

5 Claims, 3 Drawing Sheets

METHOD FOR DETECTING TARGET OBJECTS AND FOR DETERMINING THEIR DIRECTION AND THE LIKE FOR A RADAR DEVICE

This application claims priority to International Application No. PCT/DE00/00011 filed Jan. 3, 2000 which was published in the German language on Jul. 13, 2000.

TECHNICAL FIELD OF THE INVENTION

The invention relates to a method for detecting target objects and for determining their direction, range, speed and the like for a radar device.

BACKGROUND OF THE INVENTION

As disclosed, for example, in EP 0 727 051 B1, radar technology has become important for use in the motor vehicle industry to the extent that safety standards for a motor vehicle must be continuously adapted as the traffic density becomes ever greater. Radar devices have been designed to detect both stationary target objects and target objects moving relative to a motor vehicle, without making any contact with them. These devices can determine their range, speed, condition, presence, direction, etc. The radar devices used for this purpose are essentially based on two main traffic techniques relating to radar technology, which are known by the names "simultaneous lobing" and "sequential lobing".

The term "simultaneous lobing" means a monopulse radar technique. The radar devices used to implement this technique and which use this technique include a transmitting and receiving device having typically 2 (one-dimensional) or 4 (two-dimensional) detection areas, which partially overlap and are evaluated simultaneously. The aim is to obtain an accurate measurement of the position angle of the target object with respect to the radar device axis by means of intensity comparison. Angular resolution is not feasible, that is to say two or more objects at the same distance cannot as such be resolved separately from one another, since only a single object is detected rather than the at least two objects and, furthermore, this object is associated with an incorrect position angle.

The radar technique of "sequential lobing" means the production of a number of beams with different beam fields and activation and evaluation of these beams at different times. The angular accuracy achieved in this way does not satisfy stringent demands for accurate measurement of the position angle of the target object, for use in motor vehicles. This is primarily due to the fact that, in this method, fluctuation errors which occur to a considerable extent have a very major influence on the measurement of the position angle, so that the measurements are subject to considerable intensity fluctuations. This can lead, inter alia, to misinterpretations of the position angle change when the signals are evaluated.

The document U.S. Pat. No. 5,598,163 discloses a multi-beam radar system, which has a number of transmitting and receiving devices. The detection area of the radar system in this case comprises the beam fields of the receiving devices. The echo signals are in this case evaluated using the monopulse method.

SUMMARY OF THE INVENTION

In one embodiment of the invention, there is a method for detecting target objects using a radar device, including arranging at least three transmitting and receiving devices for radar beams such that their beam fields form a detection area of the radar device; activating and deactivating the at least three transmitting and receiving devices such that at least two adjacent transmitting and receiving devices are operated simultaneously, and evaluating the echo signals from the transmitting and receiving devices using the monopulse method.

In one aspect of the invention, one pair of adjacent transmitting and receiving devices are activated simultaneously.

In another aspect of the invention, at least one of the currently deactivated transmitting and receiving devices is reactivated for activation of the at least two transmitting and receiving devices.

In yet another aspect of the invention, the echo signals from the transmitting and receiving devices are evaluated individually on the basis of range, speed and intensity.

In still another aspect of the invention, the position angle of the target object relative to the radar device is determined by comparison of the intensities of the at least two transmitting and receiving devices.

BRIEF DESCRIPTION OF THE DRAWINGS

Details and features of the invention can be found in the following description, in which.

DETAILED DESCRIPTION OF THE PREFERRED EMBODIMENTS

A known multibeam radar system for motor vehicles has at least three transmitting and receiving devices (EP 0 805 360 A2). Channel control allows the transmitting and receiving devices to be controlled in such a manner that a number of adjacent transmitting and receiving devices are operated simultaneously, and this leads to high angular resolution.

In one embodiment of the invention, there is a method of the type which achieves particularly high position angle measurement accuracy by avoiding fluctuation errors in the measurement process, and nevertheless allows resolution between a number of objects at the same distance.

This is achieved in one embodiment by arranging at least three transmitting and receiving devices for radar beams in a radar device in such a manner that their beam fields form the detection area of the radar device, and by successively activating and deactivating the at least three transmitting and receiving devices in such a manner that at least two adjacent transmitting and receiving devices are operated simultaneously. To this extent, the overall detection area of the radar device in the method according to the invention is subdivided into a number of area elements, in this case referred to as beam fields, which, in pairs or else in groups of a number of them, form a detection area element, which scans the entire detection area successively. The terms successive activation and deactivation in this case mean that the beam fields are not all active at the same time. The number of transmitting and receiving devices to be activated for one detection area element may also vary during a scanning process. Using a method such as this, the advantages of the two known methods "simultaneous lobing" and "sequential lobing" are combined in one method or in one device form in such a manner that the specific disadvantages of each of the known methods are also compensated for.

In another embodiment, a small detection area element which includes two transmitting and receiving devices is intended to be created, which effectively ensures accurate, step-by-step scanning of the entire detection area of the radar device.

In another embodiment of the invention, there is a sequence of a radar scan covering the entire detection area. This sequence comprises overlapping of successively activated detection area elements by at least one beam field of a transmitting and receiving device. For example, after deactivation of one pair of transmitting and receiving devices, a new pair is defined for activation in such a manner that, firstly, the transmitting and receiving device which is adjacent to the currently deactivated pair is activated. Secondly, that the currently deactivated transmitting and receiving device which is adjacent to the latter is reactivated.

Figure 1:
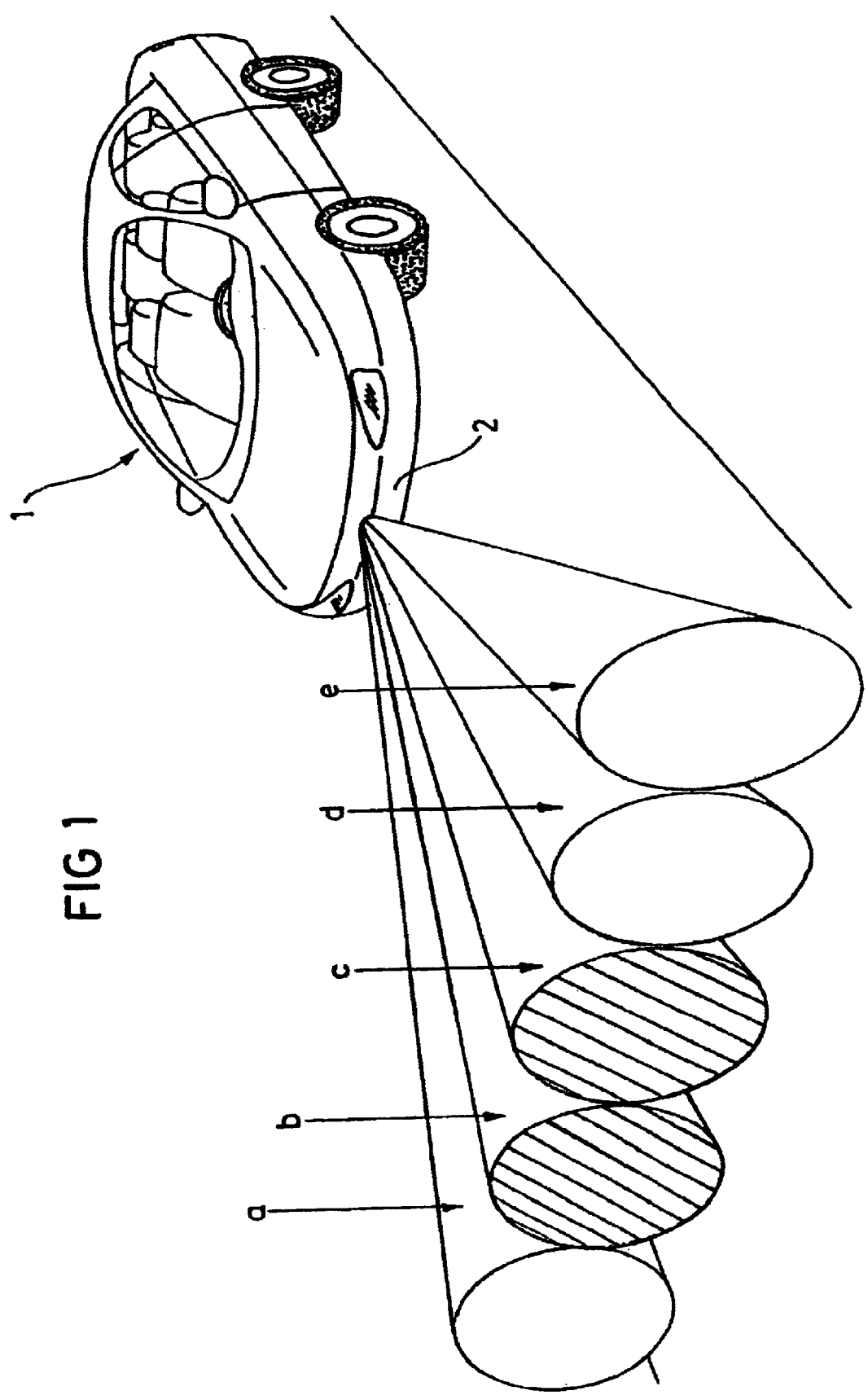
FIG. 1 shows a perspective view of a passenger vehicle which has a radar device according to the invention.

Radar devices which operate using the method according to the invention are used in particular in motor vehicles in order, for example, to determine the range to other motor vehicles continuously. FIG. 1 shows a passenger vehicle 1 which, centrally in its front area 2, has a radar device which is accommodated in the bodywork (not shown in FIG. 1). This radar device has five transmitting and receiving devices, each of which emit radar beams in a known manner. Each of these beams from the transmitting and receiving devices is associated with a specific scanning area, which can be seen in FIG. 1 in the form of a beam field a, b, c, d or e. Each of these beam fields a, b, c, d, e has a shape which extends conically from the radar device and overlaps the respectively adjacent beam field. To this extent, the illustration in FIG. 1, with its touching beam fields, should be regarded only as a model illustration.

According to the invention, the radar device acts in such a way that one pair of transmitting and receiving devices are successively activated simultaneously, while the remaining three transmitting and receiving devices are deactivated. At the instant in the scanning process shown in FIG. 1, those transmitting and receiving devices whose beam fields are b and c are activated, and those transmitting and receiving devices whose beam fields are a, d and e are deactivated.

Figure 2:
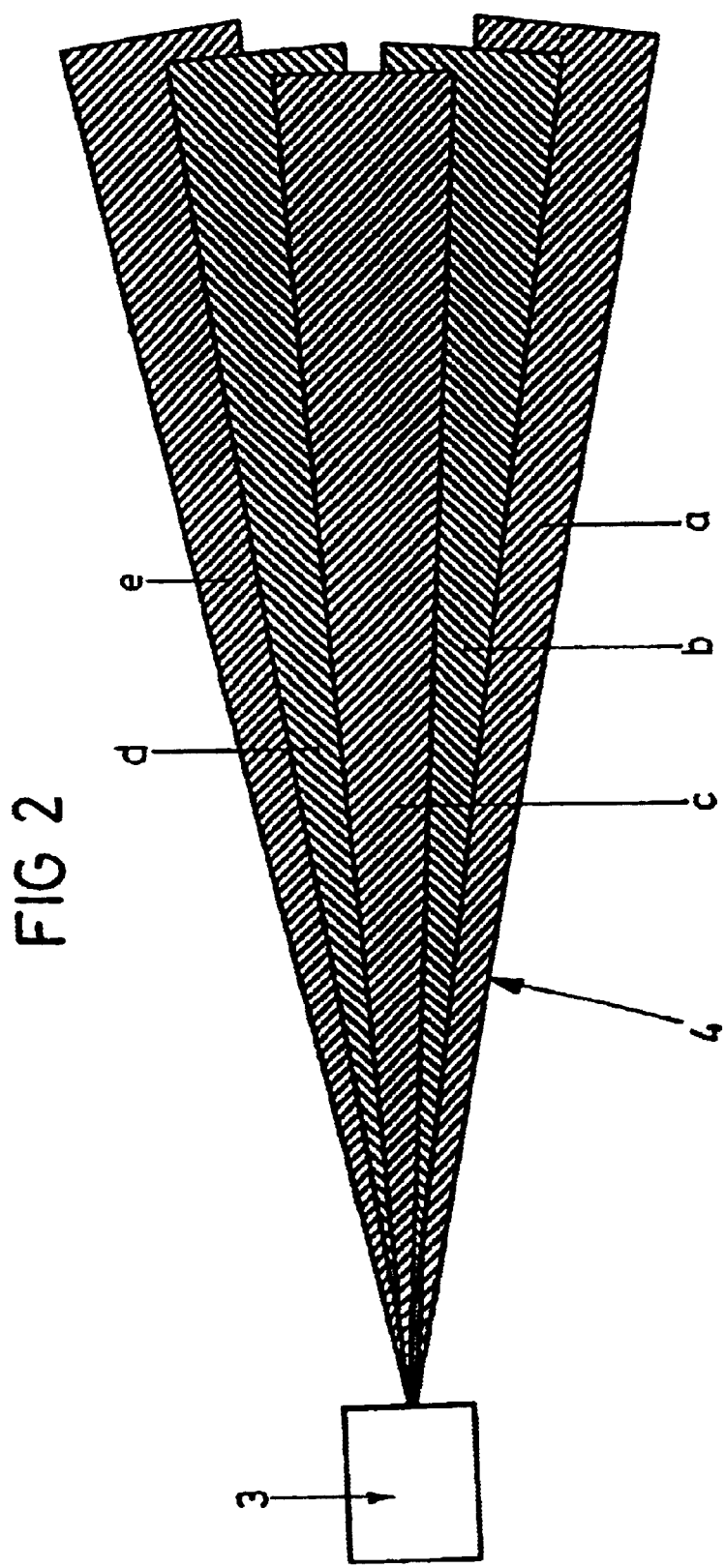
FIG. 2 shows a schematic illustration of the radar device with its individual beam fields.
Figure 3:
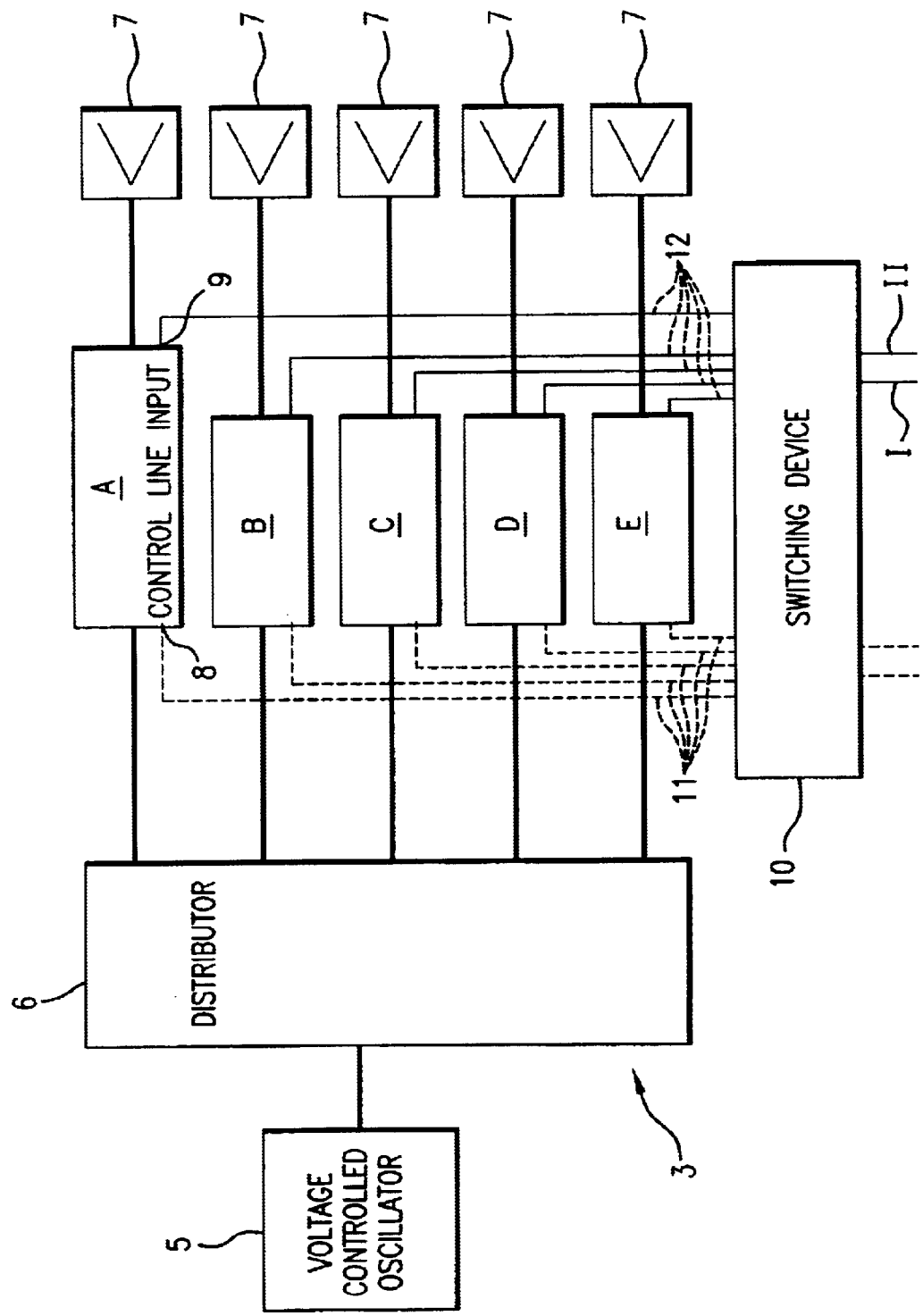
FIG. 3 shows a block diagram of a radar device.

FIG. 2 illustrates the beam field arrangement of the radar device 3. The beam fields a, b, c, d, e are dimensioned to be of the same size and are arranged in such a manner that they overlap their respectively adjacent beam field. The extent of the overlap between the beam fields a, b, c, d, e is approximately half the width of one beam field. The detection area 4 is bounded by the two outer beam fields a and e and has a shape which extends in divergent manner from the radar device 3 in the detection plane.

In order to achieve particularly reliable coverage of the detection area 4, the radar device 3 according to the invention preferably operates in accordance with the sequence shown in Table 1, below.

TABLE 1

|  | Beam pair a/b | Beam pair b/c | Beam pair c/d | Beam pair d/e |
|---|---|---|---|---|
| Transmitter + receiver A | on | off | off | off |
| Transmitter + receiver B | on | on | off | off |
| Transmitter + receiver C | off | on | on | off |
| Transmitter + receiver D | off | off | on | on |
| Transmitter + receiver E | off | off | off | on |
| IF output I | beam a | beam b | beam c | beam d |
| IF output II | beam b | beam c | beam d | beam e |

It can be seen from this that the transmitting and receiving devices A, B, C, D and E are each activated in pairs, thus producing four different beam field pairs a/b, b/c, c/d, d/e. The transmitting and receiving devices are thus continuously switched on and off in pairs. This makes it possible to achieve particularly high position angle accuracy for a target object since, (a) a number of beam fields, in this case five, are used, and (b) activation of beam pairs avoids the angle measurement errors resulting from signal fluctuation.

A scanning process for the detection area 4 comprises successive activation of transmitting and receiving device pairs from left to right or from right to left (see FIG. 1). In this sequence, after the deactivation of a beam pair b/c, for example, the new transmitting and receiving device pair c/d is then activated, followed by the transmitting and receiving device pair d/e, etc. This results in a scanning process which has a further overlapping detection characteristic, due to the renewed activation of a deactivated transmitting and receiving device.

The radar device 3, which operates using the method according to the invention, is illustrated in FIG. 4. It comprises a voltage controlled oscillator 5, which produces an operating frequency in a band, which is normal for passenger vehicle applications, in a range from 76 to 77 GHz. Gunn diodes or HEMTs are particularly suitable for this purpose. The operating frequency is passed to a distributor 6 which supplies the radar signals to the respective transmitting and receiving devices A, B, C, D and E. The distribution can be carried out, for example, by means of passive dividers or by appropriate RF switches. The transmitting and receiving devices A to E are each connected to an antenna 7 for the beam fields A to E. The transmitting and receiving devices A to E each have a control line input 8 and an IF signal output 9. The control line inputs 8 are connected to a switching device 10, which is controlled by a control unit, which is not illustrated. The above components can be provided, for example, by using a microprocessor. If, now, for example, the transmitting and receiving devices B and C are activated during a scanning process, the switch 10 is switched such that a signal is supplied via the corresponding control lines 11 to the control line inputs 8 of the transmitting and receiving devices B and C. This signal activates the two selected transmitting and receiving devices B and C. Received echo signals are supplied via the IF signal outputs 9 from the transmitting and receiving devices B and C to the switch 10 as an intermediate-frequency signal (IF signal) via IF signal lines 12. These signals are passed on via IF outputs I, II to the control unit in order to evaluate them. The last two lines in Table 1 show which of the echo signals is supplied via the IF outputs I, II by the switch 10 to the control device during the method sequence.

What is claimed is:

1. A method for detecting target objects using a radar device, comprising:

arranging at least three transmitting and receiving devices for radar beams such that their beam fields form a detection area of the radar device;

successively activating and deactivating the at least three transmitting and receiving devices such that at least two but not all of the at least three adjacent transmitting and receiving devices are operated simultaneously; and evaluating echo signals from the transmitting and receiving devices using monopulse-radar.

2. The method as claimed in claim 1, wherein a pair of adjacent transmitting and receiving devices are activated simultaneously.

3. The method as claimed in claim 1, wherein at least one of the deactivated transmitting and receiving devices is reactivated for activation of the at least three transmitting and receiving devices.

4. The method as claimed in claim 3, wherein the position angle of the target object relative to the radar device is determined by comparison of beam intensities of the at least three transmitting and receiving devices.

5. The method as claimed in claim 1, wherein the echo signals from the transmitting and receiving devices are evaluated individually on the basis of range, speed and intensity.

* * * * *